UNITED STATES PATENT OFFICE.

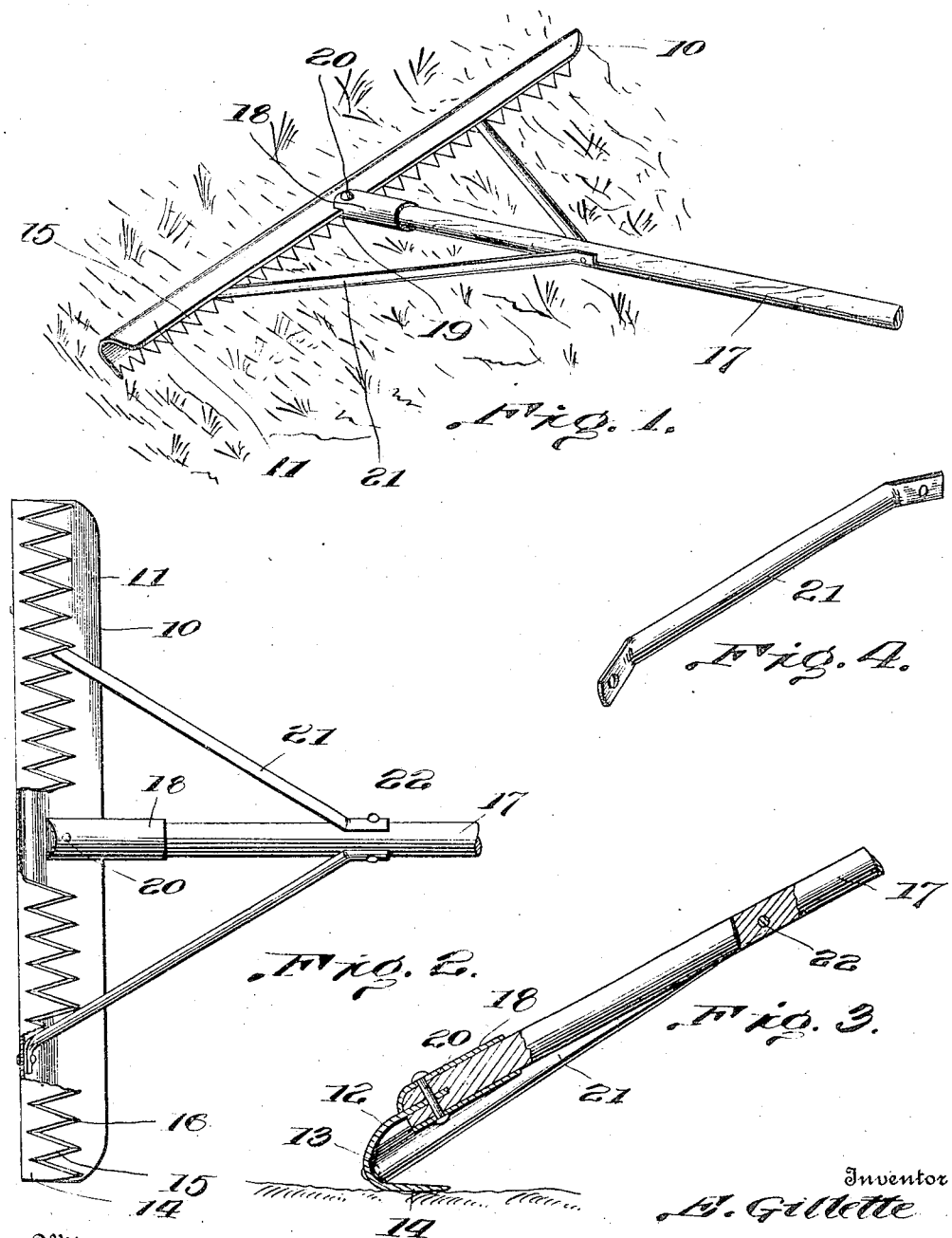

ERNEST GILLETTE, OF KEARNEY, NEBRASKA.

HAND-RAKE.

1,122,730.  Specification of Letters Patent.  Patented Dec. 29, 1914.

Application filed July 13, 1914. Serial No. 850,780.

*To all whom it may concern:*

Be it known that I, ERNEST GILLETTE, citizen of the United States, residing at Kearney, in the county of Buffalo and State of Nebraska, have invented certain new and useful Improvements in Hand-Rakes, of which the following is a specification.

This invention relates to certain new and useful improvements in hand rakes, and has as its primary object to provide a device of this character so constructed as to fulfil the function of an ordinary rake, and which may be further employed to sever and collect the blossoms of plants or weeds which often grow upon a lawn, the said blossoms in a great many instances, being so close to the surface of the lawn, that an ordinary mower cannot reach them.

The invention has as a further object to provide an improved rake of this character, which will be simple in construction and so formed that the cutting element thereof, in the normal position of the rake when in use, will be disposed parallel with the surface to be raked.

With these and other objects in view, my invention will be more fully described, illustrated in the accompanying drawings, and then specifically pointed out in the claim which is attached to and forms a part of this application.

In the accompanying drawings: Figure 1 is a perspective view of my improved rake, the handle thereof being shown as broken away. Fig. 2 is a bottom plan view of the rake especially showing the construction of the teeth formed thereon and the manner in which said teeth are provided with cutting edges as well as the arrangement of the braces, which connect with the handle. Fig. 3 is a sectional view showing the formation of the body portion of the rake as well as the mounting of the handle thereon, and Fig. 4 is a detail perspective view of one of the braces employed.

Corresponding and like parts are referred to in the following description and indicated in all the views of the drawings, by the same reference characters.

Referring more particularly to the drawings, the body portion 10 of my improved rake is preferably formed from a single piece of suitable resilient sheet metal of the desired length, one longitudinal margin 11 of which is preferably flat and straight, as shown. At the inner extremity of the portion 10, the body portion is bent transversely to extend laterally upon one side of the portion 11, and obliquely away therefrom, as shown at 12, the said obliquely directed portion 12 of the body portion, being also substantially straight and flat as shown. At the inner extremity of the portion 12, the body portion is transversely and continuously curved inwardly upon itself, as shown at 13, and the adjacent margin thereof, terminates in a substantially straight flat horizontally disposed portion 14, the portion 14 being arranged in spaced relation upon one side of the margin 11 of the body portion. It will be observed, in thus forming the body portion 10 of the rake, that when the horizontally disposed portion 14 thereof, is arranged to rest flat upon the ground, the margin 11 is caused to extend above said portion 14 at such an angle as to be, under normal conditions, in alinement with the horizontal axis of a handle secured thereto. This is a very important feature of my invention, since it is intended, when the rake is used in severing blossoms which grow closely to the surface of a lawn, as will be presently described, that said portion 14 of the body portion of the rake, shall bear flat against the surface of the lawn, to move smoothly thereover.

Formed in the longitudinal edge of the margin 14 of the body portion, is a series of longitudinally spaced teeth 15, the edges of each of said teeth converging toward the free extremity thereof, as shown. Upon their outer faces and along the edges thereof, the teeth 15 are beveled or cut away to provide cutting edges 16, the said cutting edges being thus disposed, in the normal operative position of the rake, as best shown in Fig. 3 of the drawings, close to the surface to be raked.

Secured to the margin 11 of the body portion midway the ends thereof, is a handle 17. The handle 17 may be formed of any suitable material, and is preferably slotted at its inner end to embrace the longitudinal edge of the margin 11, as best illustrated in Fig. 3 of the drawings, and fitting over the end of the handle is a socket 18. As usual, in devices of this character, the handle 17 is preferably circular, and may be formed of wood and consequently to properly reinforce the handle at its inner end, the socket 18 is preferably formed of metal, being of such diameter, that the inner extremity of the handle will fit tightly therein. The socket 18 is grooved at its inner end as shown at 19, to receive the adjacent edge of the margin 11 of the body portion, and extending through the adjacent extremity of the handle and through the inner end of the socket 18 to connect the handle with the margin 11 of the body portion, is a bolt 20, or other fastening means. It will be observed in thus connecting the handle 17 with the body portion 10 of the rake, that the longitudinal axis of the handle is disposed in alinement with the margin 11 thereof, and extends away from the margin 14 of the body portion at such an angle, that under normal conditions, the margin 14, will bear flatly against the surface to be raked in the practical use of the device, when the handle is held in the hands of the user in the usual manner.

Extending between the handle 17 adjacent the inner extremity thereof and the body portion 10 are braces 21 one of said braces being shown in detail in Fig. 4 of the drawings. The braces 21 are each preferably formed from suitable metal and may be connected at their outer extremities to the handle 17 in any suitable manner, as by a bolt 22. The braces 21 diverge from the connection 22 in opposite directions and are secured at their outer extremities, with the body portion 10, adjacent opposite ends thereof, as shown. The said braces are thus adapted to rigidly support the body portion 10 upon the handle 17, as will be clear, and it will therefore be noted that I provide a very simple and durable construction of rake.

Attention is now called to the fact that by moving the working edge of the body portion of the rake over a lawn or other surface in the manner shown in Fig. 3 of the drawings, any blossoms which grow closely to the surface of the lawn, such for instance, as the usual dandelion blossoms, which are frequently found upon lawns, will be severed upon coming in contact with the cutting edges 16 of the teeth 15, to be collected within the body portion of the rake. In this connection, it will be seen that I provide a thoroughly efficient construction, since the margin 14, of the body portion 10 of the rake will, under normal conditions, bear flatly against the lawn in order that the teeth 15 may readily pass beneath any blossoms growing therein, and which are partially embedded within the grass of the lawn, to effect the severance of said blossoms. It will further be noted in providing the teeth 15 with a plurality of inclined cutting edges 16, that, under normal conditions, the inclined cutting edges will exert a shearing action upon the stems of any blossoms coming in contact therewith, when the rake is drawn forwardly over the lawn, to thus easily and with facility, effect the severance of the stems of said blossoms.

Although my improved rake is especially adapted for use, as above described, still, it is to be noted that by tilting the handle 17 toward the ground, in practical use the teeth 15 will be brought into angular relation to the ground, to bite into the ground and serve the function of an ordinary rake having teeth extending at right angles to the handle thereof. It will thus be seen that I provide a very efficient construction of rake, which, while being adapted to sever the stems of plants projecting from a surface to be raked, may also be used in the capacity of an ordinary rake, such for instance, as in cultivation or in the raking of leaves or other foreign matter from a lawn.

Having thus described my invention, what I claim and desire to secure by Letters Patent is:—

A device of the character described formed from a single piece of suitable metal and provided with straight flat margins joined by a curved connecting portion, the said margins confronting each other and one of said margins extending obliquely away from the other margin, a handle having a slot formed at its inner end to receive the edge of said obliquely arranged margin, a socket fitting over the inner end of the handle and slotted at one end to receive said margin, a bolt extending through said socket, the handle and said margin and connecting the handle with the body portion, and braces each secured at one extremity, to the inner face of the curved portion of the body portion and extending at their opposite extremities to connect with the handle, the margin of the body portion opposite to that carrying the handle having a series of longitudinally spaced teeth formed therein, each having inclined edges converging toward the free ends of said teeth, the margins of said teeth being cut away to provide cutting edges.

In testimony whereof I affix my signature in presence of two witnesses.

ERNEST GILLETTE. [L. S.]

Witnesses.
   C. L. SWARTSLEY,
   J. H. LEAN.